(12) United States Patent
Horner

(10) Patent No.: US 8,571,043 B2
(45) Date of Patent: Oct. 29, 2013

(54) USING A SINGLE POINT CODE TO REPRESENT MULTIPLE SWITCHING DEVICES

(75) Inventor: Larry J. Horner, McKinney, TX (US)

(73) Assignee: Sonus Networks, Inc., Westford, MA (US)

( * ) Notice: Subject to any disclaimer, the term of this patent is extended or adjusted under 35 U.S.C. 154(b) by 1260 days.

(21) Appl. No.: 11/377,232

(22) Filed: Mar. 16, 2006

(65) Prior Publication Data

US 2007/0217454 A1      Sep. 20, 2007

(51) Int. Cl.
- H04L 12/66 (2006.01)
- H04L 12/28 (2006.01)
- H04L 12/56 (2011.01)
- H04J 3/12 (2006.01)

(52) U.S. Cl.
USPC ............................. 370/401; 370/352; 370/522

(58) Field of Classification Search
USPC .......................................... 370/522, 352, 401
See application file for complete search history.

(56) References Cited

U.S. PATENT DOCUMENTS

| | | | |
|---|---|---|---|
| 5,440,626 A | 8/1995 | Boyle et al. ................ 379/219 |
| 6,389,011 B2 | 5/2002 | Allen, Jr. et al. ............ 370/356 |
| 6,792,100 B2 | 9/2004 | Nekrasovskaia et al. .... 379/230 |
| 6,823,061 B2* | 11/2004 | Prasad et al. ............... 379/230 |
| 2001/0030968 A1* | 10/2001 | Hallenstal et al. .......... 370/395 |
| 2001/0036173 A1* | 11/2001 | Shmulevich et al. ........ 370/352 |
| 2002/0093947 A1* | 7/2002 | Allen et al. ................. 370/352 |
| 2002/0131400 A1* | 9/2002 | Tinsley et al. .............. 370/352 |
| 2002/0131427 A1* | 9/2002 | Niermann ................... 370/401 |
| 2002/0196779 A1* | 12/2002 | Khadri et al. .............. 370/352 |
| 2003/0031307 A1* | 2/2003 | Khadri et al. .............. 379/221.1 |
| 2003/0118001 A1* | 6/2003 | Prasad et al. ............... 370/352 |
| 2003/0123633 A1* | 7/2003 | Hines et al. ............. 379/220.01 |
| 2003/0152064 A1* | 8/2003 | Khan et al. ................. 370/352 |
| 2003/0169867 A1* | 9/2003 | Nekrasovskaia et al. ... 379/229 |
| 2003/0231622 A1* | 12/2003 | Gilchrist et al. ............ 370/352 |
| 2005/0152383 A1* | 7/2005 | Schantz ..................... 370/410 |
| 2005/0163113 A1 | 7/2005 | Angermayr et al. ......... 370/385 |

FOREIGN PATENT DOCUMENTS

| EP | 0 435448 A2 | 7/1991 |
|---|---|---|
| WO | WO 95/15048 | 6/1995 |

OTHER PUBLICATIONS

"Signalware Gateway—Interconnecting SS7 and IP Networks", Ulticom, printed on Nov. 8, 2006 from http://www.ulticom.com/docs/ULCM-signalwaregateway-0904.pdf (pp. 1-2).

(Continued)

Primary Examiner — Hassan Phillips
Assistant Examiner — Lonnie Sweet
(74) Attorney, Agent, or Firm — Straub & Pokotylo; Michael P. Straub; Stephen T. Straub

(57) ABSTRACT

Described are methods and apparatus, including computer program products, for using a single point code to represent multiple switching devices. A first software node and a second software node are associated to the single point code. The first software node is assigned to a first switch and the second software node is assigned to a PSTN. Signaling data associated with the point code is received via signaling links associated with the first switch. The signaling data is routed to the first software node or a second switch based on a criterion.

24 Claims, 14 Drawing Sheets

(56) References Cited

OTHER PUBLICATIONS

"Signalware Gateway Virtual-STP—Bridging SS7 and SIGTRAN Protocols", Ulticom, printed on Nov. 8, 2006 from http://www.ulticom.com/docs/ULCM-VSTPSOLUTIONBRIEF-0904.pdf (pp. 1-2).

"Virtual-STP—Converging an IP-Based Signaling Infrastructure with the Legacy SS7 Network Using Signaling Gateways", Ulticom, printed on Nov. 8, 2006 from http://www.ulticom.com/docs/ULCM-VSTPwhitepaper-0904.pdf (pp. 1-8).

Office Action of Feb. 26, 2010 received in U.S. Appl. No. 11/377,625, which shares the same filed and specification as U.S. Appl. No. 11/377,232.

* cited by examiner

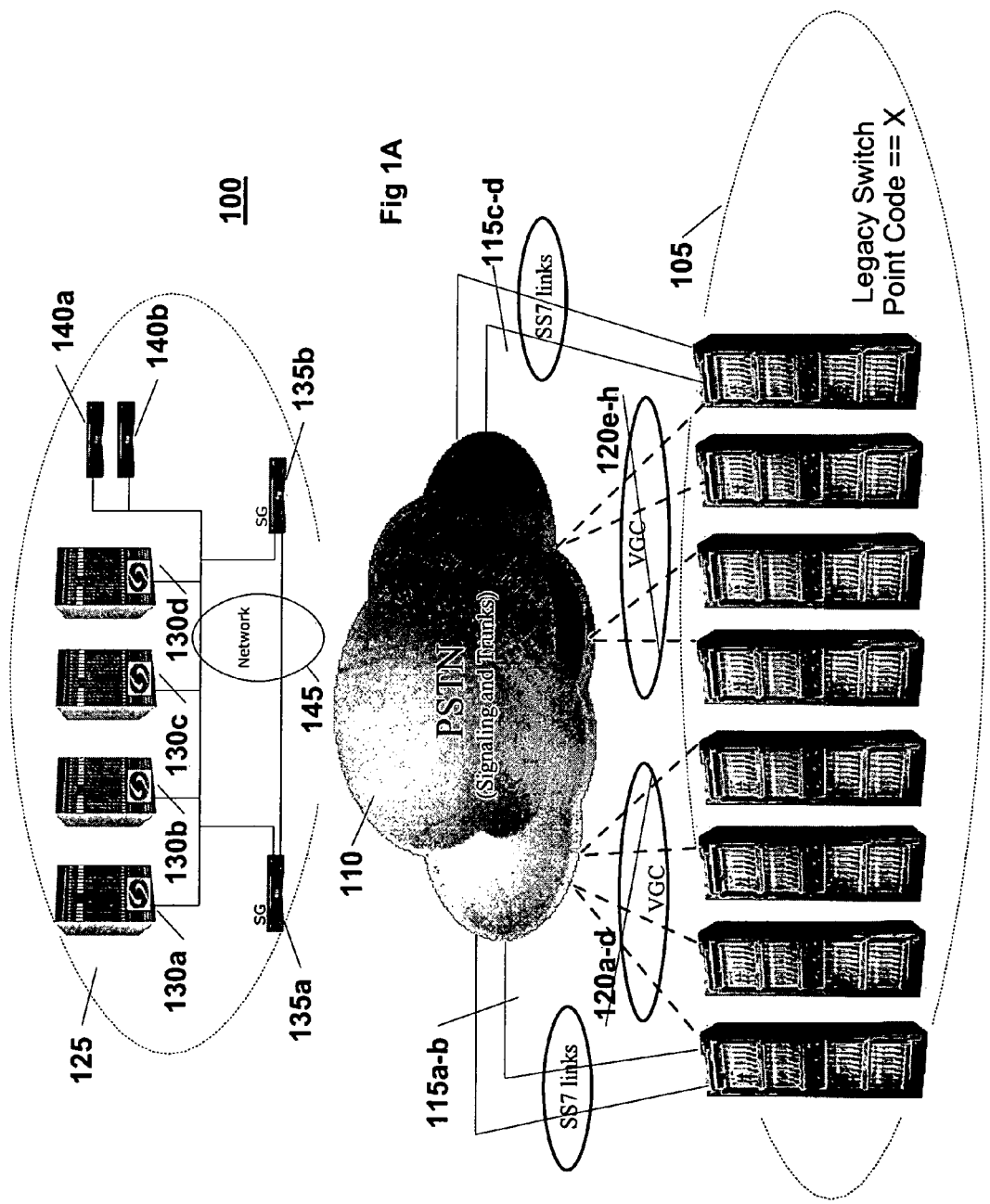

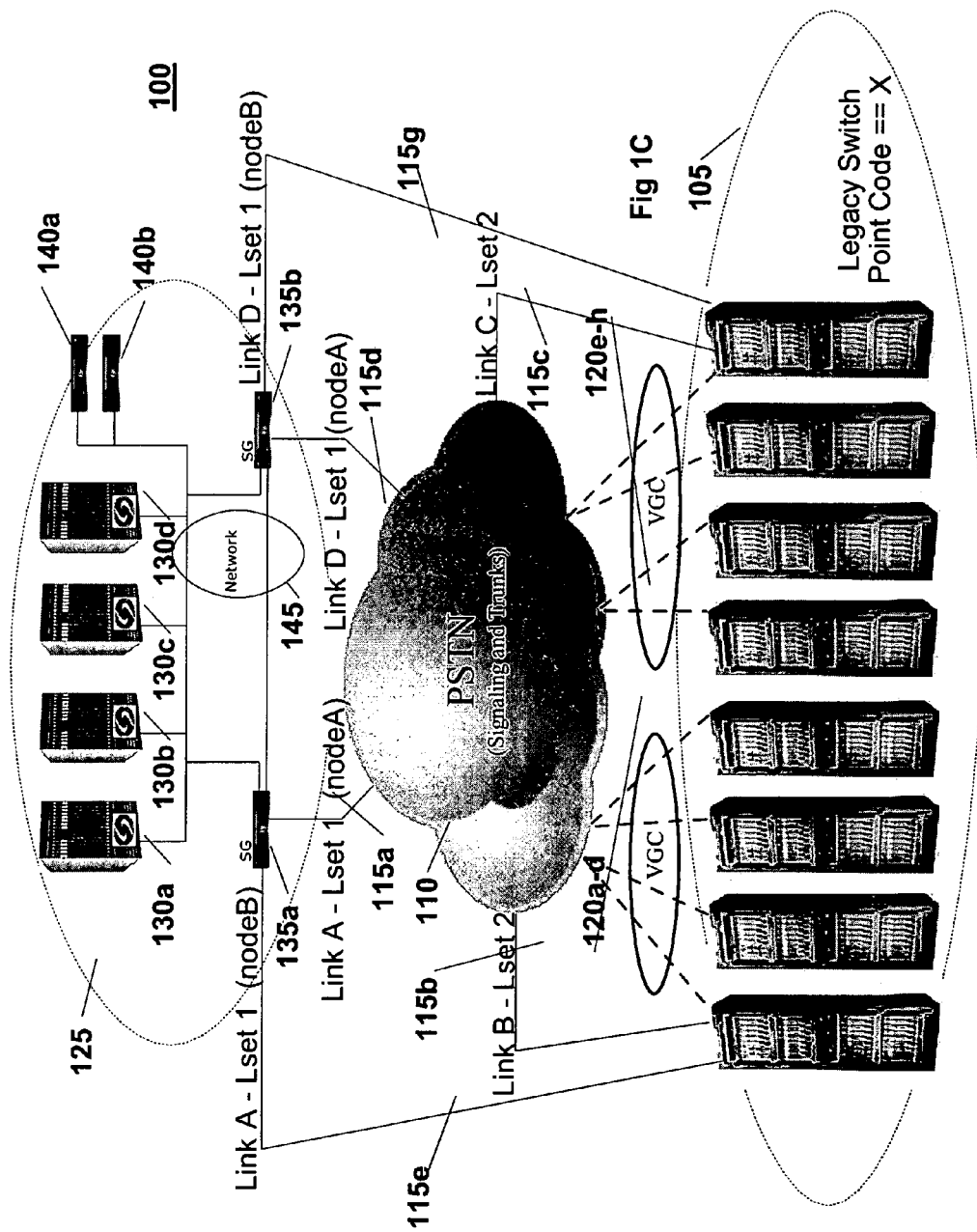

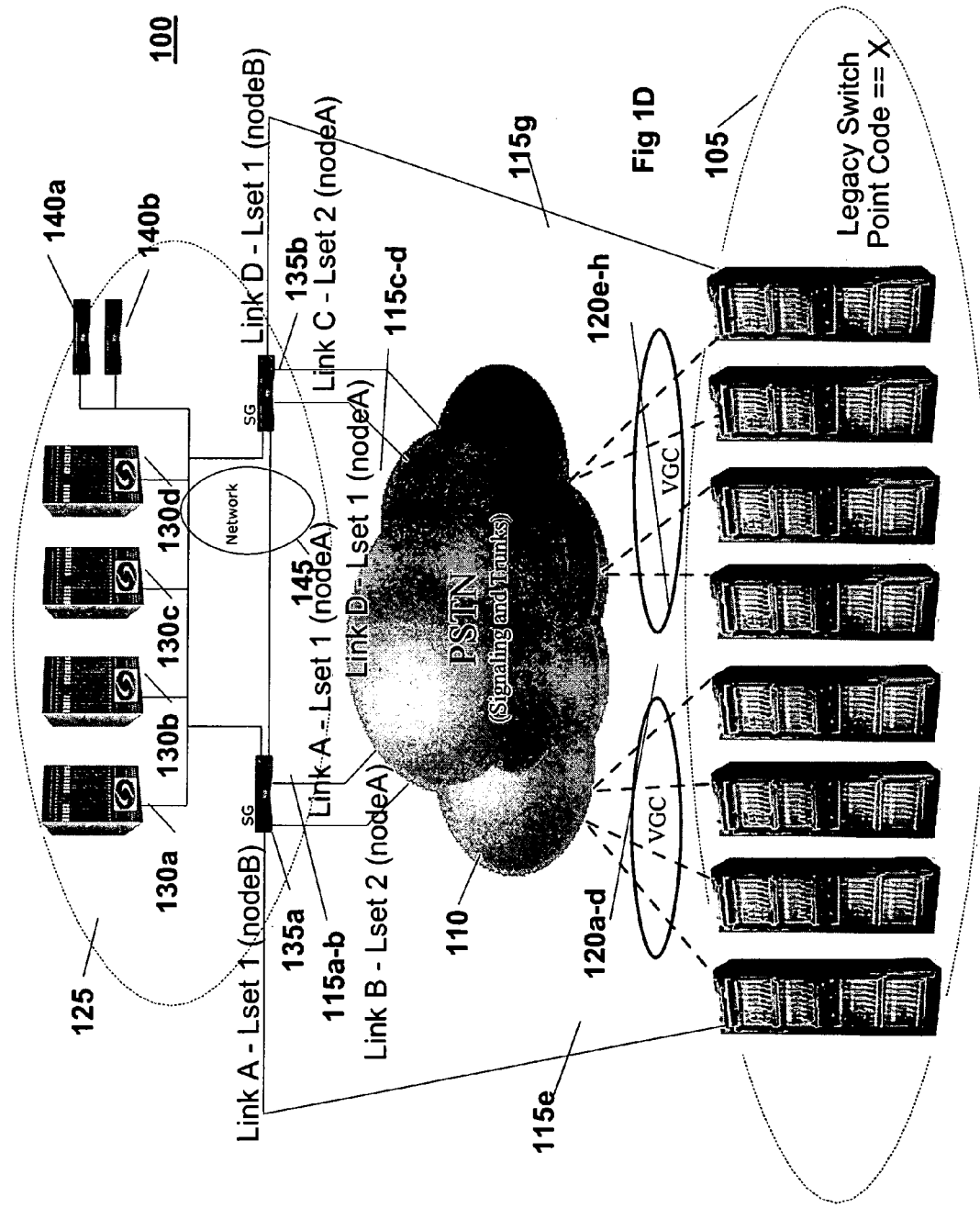

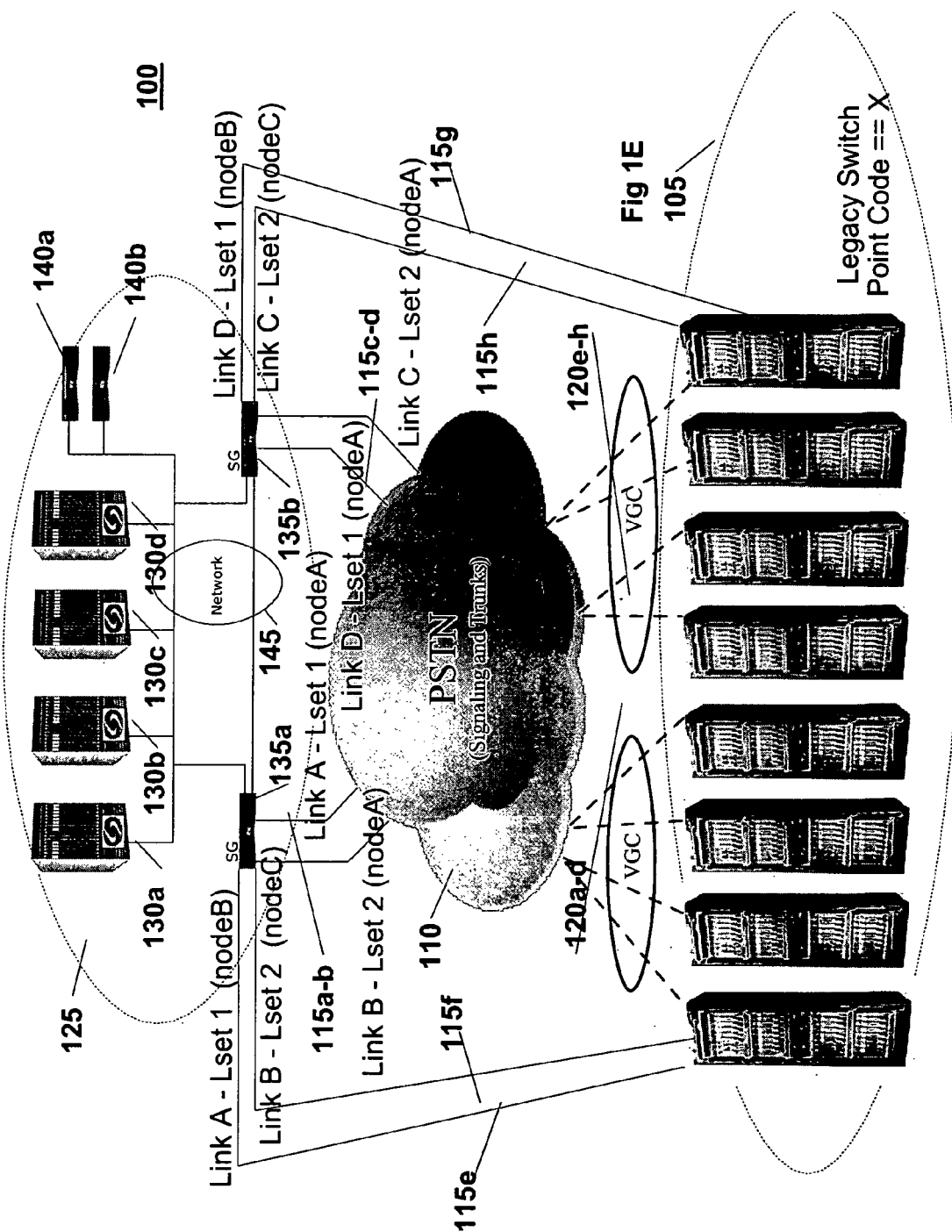

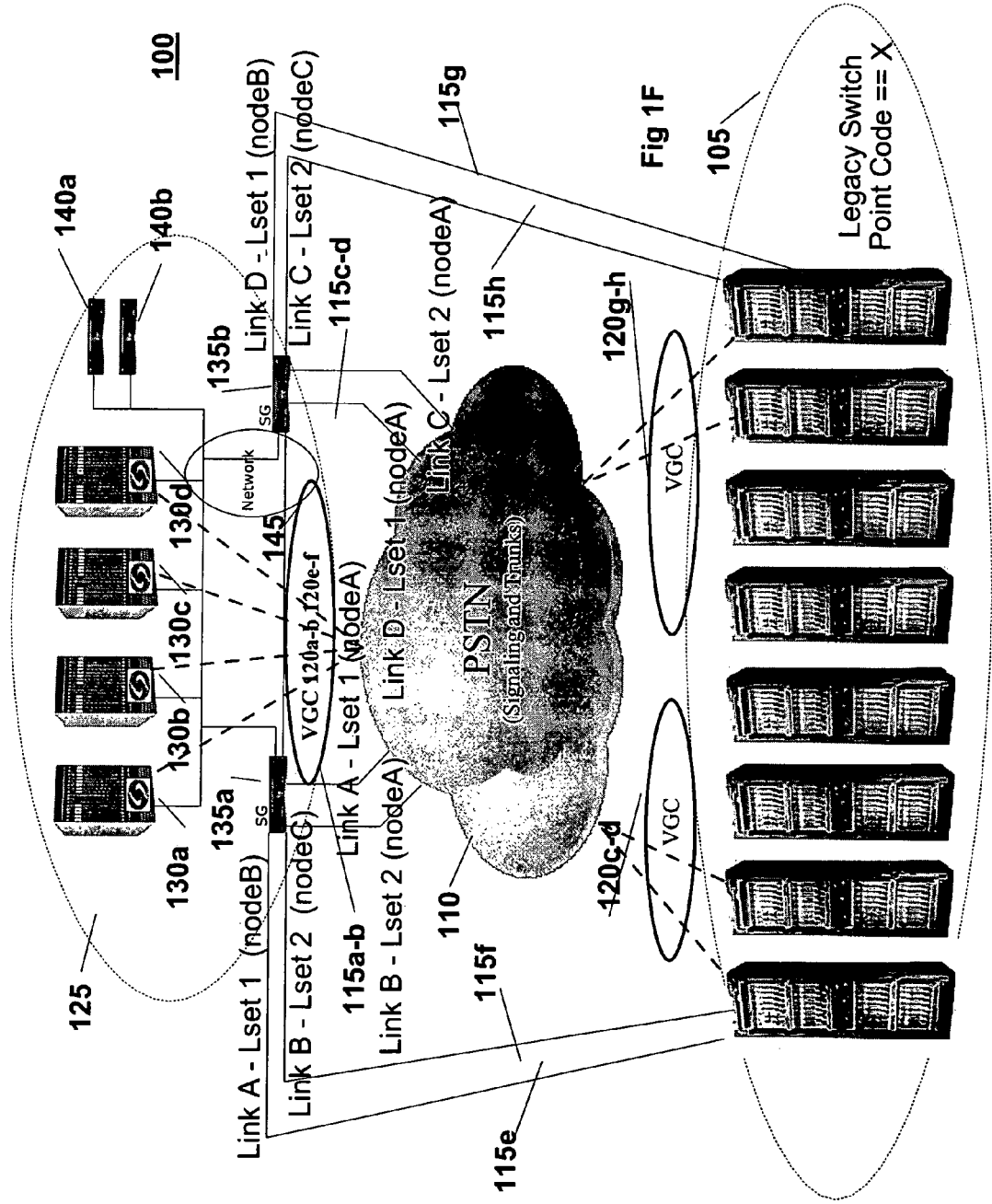

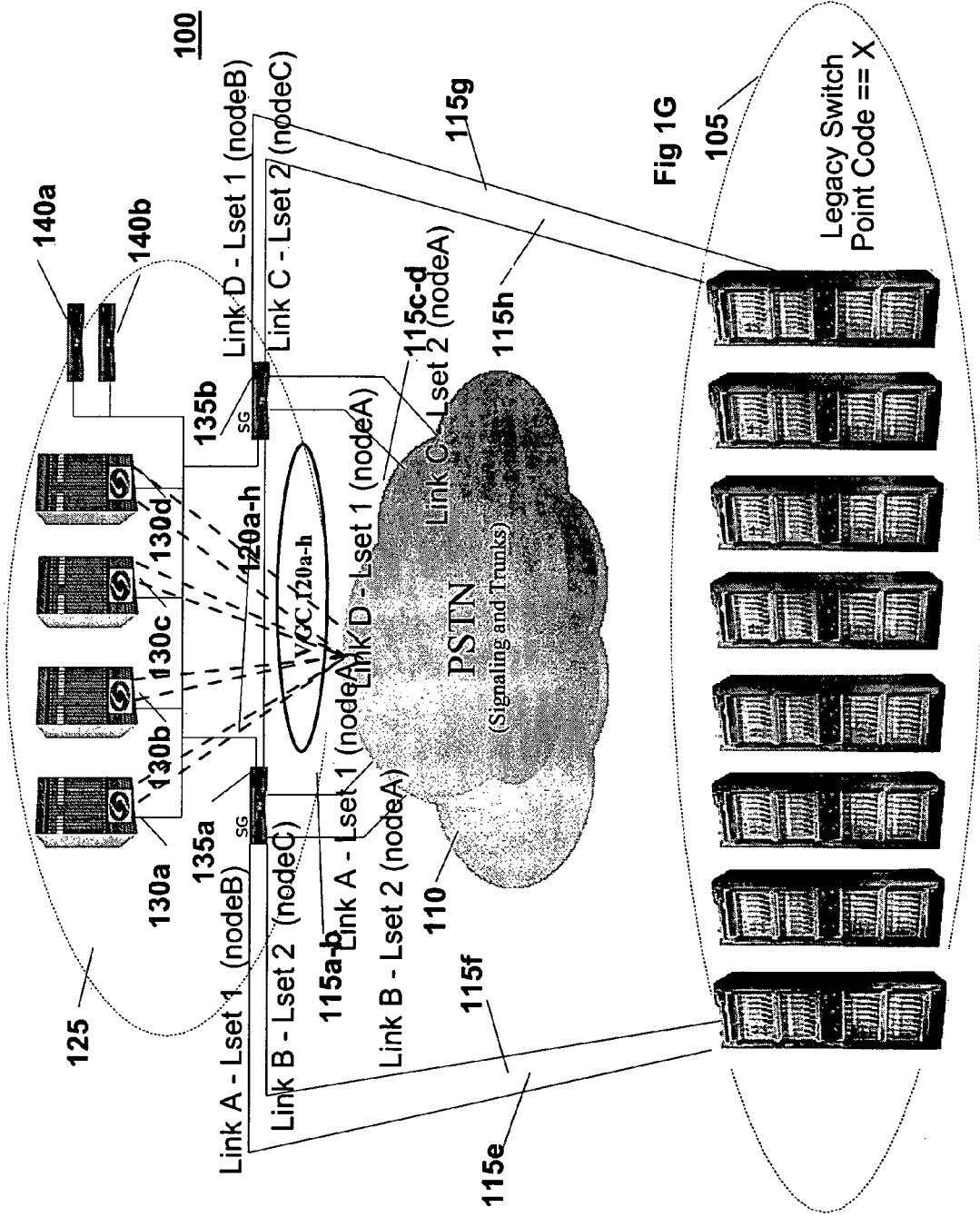

Network Facing Node

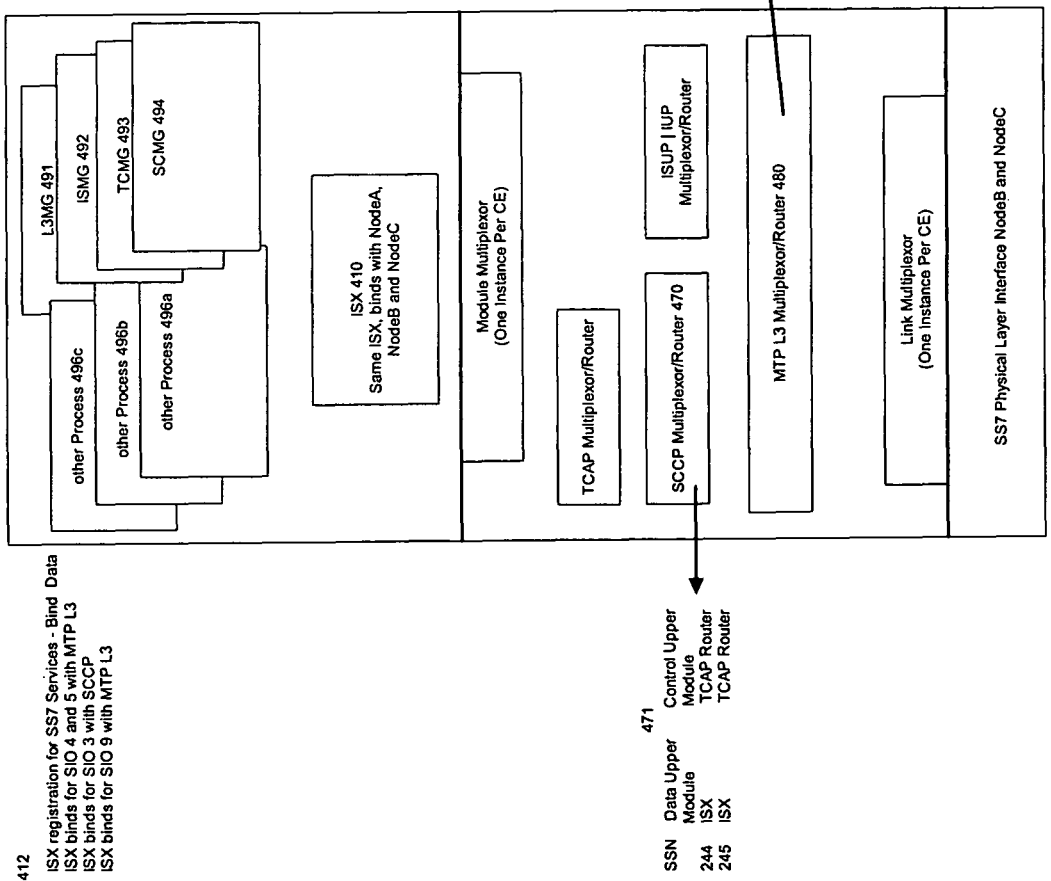

USING A SINGLE POINT CODE TO REPRESENT MULTIPLE SWITCHING DEVICES

FIELD OF THE INVENTION

The present invention relates to using a single point code to represent multiple switching devices.

BACKGROUND

Typically there are three approaches to replacing an active switch. The first approach requires the introduction of a new signaling point code for the newly introduced equipment, and the second approach is through the introduction of an alias point code. The introduction of a new signaling point code introduces significant cost due to work order processing with interconnected carriers, and the use of an alias point code forces changes in network routing and provisioning. A third and much less desirable approach is to flash cut the equipment from the active switch to the new switch using the same point code (i.e., disable and disconnect the active switch, thus temporarily disabling all of the switching capability associated with that switch, and then reconnect the new replacement switch), resulting in undesirable downtime of the switching capability associated with that point code.

SUMMARY OF THE INVENTION

The description describes methods and apparatus, including computer program products, for using a single point code to represent multiple switching devices. In general, in one aspect, there is a method for active switch replacement using a single point code. An active telephony switch is connected to the PSTN, where the active telephony switch initially is connected to a plurality of voice trunks and a plurality of signaling links and is assigned a point code. The method includes employing a first set of voice trunks from the plurality of voice trunks as active media circuits while an intermediate replacement configuration is maintained. The intermediate replacement configuration is formed by serially connecting a signaling gateway associated with a replacement switch on the plurality of signaling links, disconnecting a second set of voice trunks from the active telephony switch, where the second set of voice trunks includes less media circuits than the first set of voice trunks, and connecting the second set of voice trunks to the replacement switch.

In another aspect, there is a method for replacing an active telephony switch connected to the PSTN, where the active telephony switch is connected to a plurality of voice trunks and a plurality of signaling links and is assigned a point code. The method includes defining a replacement switch and a signaling gateway associated with the replacement switch, serially connecting the signaling gateway on a first set of signaling links from the plurality of signaling links, and serially connecting the signaling gateway on remaining signaling links from the plurality not included in the first set of signaling links before each voice trunk is disconnected from the active telephony switch. The method also includes disconnecting a first set of voice trunks from the active telephony switch, connecting the first set of voice trunks to the replacement switch, and disconnecting remaining voice trunks from the active telephony switch in the plurality not included in the first set of voice trunks. The method also includes connecting the remaining voice trunks to the replacement switch, and disconnecting the signaling links from the active telephony switch.

In another aspect, there is a system for replacing an active telephony switch connected to the PSTN, where the active telephony switch initially is connected to a plurality of voice trunks and a plurality of signaling links and is assigned a point code. The system includes a replacement telephony switch and a gateway. The replacement telephony switch is connected to a portion of the plurality of voice trunks initially connected to the active telephony switch and associated with the point code. The gateway is in communication with the replacement switch and the active telephony switch and is connected to the plurality of signaling links. The gateway is adapted to route signaling data, which is associated with the point code and trunk groups connected to the active telephony switch, to the active telephony switch and to route signaling data, which is associated with the point code and trunk groups connected to the replacement telephony switch, to the replacement telephony switch.

In another aspect, there is a signaling gateway for using a single point code to represent multiple switching devices. The signaling gateway is serially connected between a first one of the switching devices and a PSTN. The signaling gateway includes a multiplexer that receives signaling data associated with the single point code and directs the signaling data to the first one of the switching devices or a second switch in communication with the multiplexer based on a criterion.

In another aspect, there is a method for using a single point code to represent multiple switching devices. The method includes receiving signaling data associated with the point code via signaling links associated with a first switch, routing the signaling data to the first switch if the signaling data is associated with voice trunks connected to the first switch, and routing the signaling data to a second switch if the signaling data is associated with voice trunks connected to a second switch.

In another aspect, there is a method for using a single point code to represent multiple switching devices. The method includes associating a first software node and a second software node to the single point code and assigning the first software node to a first switch and the second software node to a PSTN. The method also includes receiving signaling data associated with the point code via signaling links associated with the first switch and routing the signaling data to the first software node or a second switch based on a criterion.

In other examples, any of the aspects above can include one or more of the following features. The signaling gateway can be located within the first or second switch. The signaling gateway can be serially connected at a point between the first telephony switch and the PSTN. The signaling data associated with the point code can be received via the signaling links. The signaling data can be routed to the second switch if the signaling data is associated with the second set of voice trunks. The signaling data can be routed to the first telephony switch if the signaling data is associated with voice trunks not included in the second set of voice trunks.

In some examples, at least a portion of the plurality of signaling links can include 'f' links. In some of these examples, all 'f' links are moved prior to moving non 'f' links. The signals transmitted via the first set of signaling links can be tested. The signaling gateway can communicate with the second telephony switch through a packet network. The second telephony switch can be a packet-based switch and the first telephony switch can be a circuit-based switch.

The signaling gateway can include a first logical node that acts as an endpoint to the PSTN that has been assigned the single point code and a second logical node that acts as the PSTN to the first switch. The criterion can be based on connections to voice trunks. The criterion can be based on voice trunks associated with the point code. The criterion can be based on signal type. Routing the signaling data can be based on the type of the signaling data.

Routing the signaling data is based on the type of the signaling data and specific message data contained within the signaling data. A second node can be assigned to the first switch. The signaling data can be routed to the first software node or the second software node based on a load balancing technique.

In another aspect, there is a system for using a single point code to represent multiple switching devices. The system includes a means for performing each of the methods described herein.

In another aspect, there is computer program product, tangibly embodied in an information carrier, for using a single point code to represent multiple switching devices, the computer program product including instructions being operable to cause data processing apparatus to perform any methods described herein.

Implementations can realize one or more of the following advantages. The service provider does not have to obtain another point code for each switch. The second switch can use the same point code. The replacement procedure does not require that the capacity of the first switch be diminished. The replacement procedure does not require an increase in the signaling capacity within the network. The steps of the replacement procedure can be broken up into stages and performed at various normal maintenance cycles associated with the first switch. The replacement procedure introduces check points where validation and if necessary regression to the previous operational state can be performed. The traffic processing capacity and functionality of the first switch is maintained during the initial introduction of the apparatus.

The details of one or more examples are set forth in the accompanying drawings and the description below. Further features, aspects, and advantages of the invention will become apparent from the description, the drawings, and the claims.

BRIEF DESCRIPTION OF THE DRAWINGS

FIGS. 1A-1G are block diagrams of different configurations of a system showing active switch replacement using a single point code over a period of time.

FIG. 4A-B are block diagrams showing instances of protocol stacks used by a signaling gateway for active switch replacement using a single point code.

DETAILED DESCRIPTION

Figure 1B:
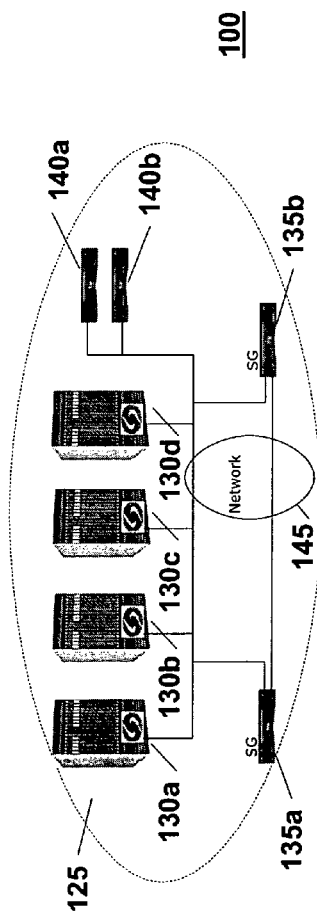
Figure 1B:
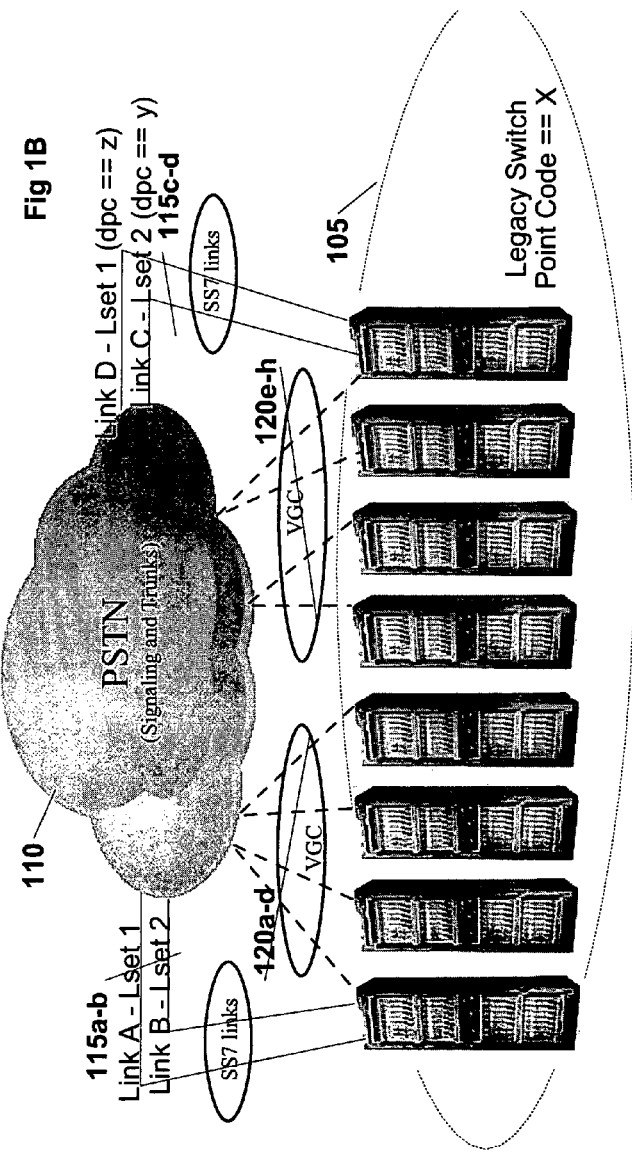

FIG. 1A illustrates an exemplary system 100 for active switch replacement using a single point code. The system 100 includes an active legacy switch 105, which can be, but is not limited to, a class 3, class 4, and/or class 5 switch, that is connected to the public switched telephone network (PSTN) 110. For illustrative purposes, the legacy switch 105 is connected to a signaling portion of the PSTN 110 using four signaling links 115a-d. In one example, the signaling links 115a-d are connected to an out-of-band network of the PSTN 110 that uses the Signaling System 7 (SS7) standard, such as the Common Channel Signaling System 7 (CCS7) network. To transmit and receive the multimedia data (e.g., voice and video), the legacy switch 105 is connected to voice grade circuits (VGC) 120a-h. Examples of VGCs can include, but are not limited to, DSO-3 links/trunk lines, and optical interfaces which can include, but are not limited to OC3's.

The system 100 also includes a replacement switch system 125. The replacement switch system 125 includes replacement switches 130a-d, signaling gateways 135a-b, and optional policy servers 140a-b. These components can be, for example, a GSX9000 Open Services Switch, a SGX SS7 Gateway, and a PSX Policy Server, respectively, each manufactured by Sonus Networks, Chelmsford, Mass. Replacement switches 130a-d can be, more generally for example, any packet-based softswitches, or classical circuit based, implementing class 3, class 4, and/or class 5 switches. The components 130a-d, 135a-b, and 140a-b communicate with each other over a network 145, which can be, for example, a packet-based Internet Protocol (IP) network, a local area network (LAN), a wireless LAN (WLAN) and the like, or over any open or proprietary network or backbone connection. Although shown as separate components, the signaling gateways 135a-b and the optional policy servers 140a-b can be integrated into the replacement switches 130a-d. Replacement switches are realized by the installation or expansion of network elements that provide the continuing services of existing network equipment, where the existing network equipment is to be removed from service. This replacement switch may be of the same or of different physical realization to the existing network equipment. In the case where the replacement switch has a different physical realization, the replacement switch may introduce features or functionality not available within the existing network equipment. One such example may be the ability to provide data transport using protocols such as IP. One other example may be the ability of the replacement switch to provide additional capability or features not present in the existing network equipment, one such example would be enhanced route selection to route calls over lower cost paths based on global or other routing criteria. Replacement switches may also be realized by the same, or a similar, physical realization, in which case the existing network equipment may be upgraded for purposes associated with replacement failing or faulty existing network equipment for purposes hardware maintenance. FIG. 1A illustrates an initial configuration wherein the replacement switch system 125 has yet to be connected to the PSTN 110. In this example, the legacy switch 105 is identified on the SS7 network of the PSTN 110 by an assigned point code "x". The point code serves as an address for routing signaling messages in the SS7 network. The point code format depends on the system. For example, ANSI point codes use 24-bits (three octets) and ITU-T point codes typically use 14-bits, except China which uses 24-bits.

FIG. 1B has labeled the signaling links 115a-d for illustrative purposes, and in this case, for example, added these links to named link sets. Signaling link 115a and signaling link 115d, links A and D respectively, are members of a named linkset Lset1. Signaling link 115b and signaling link 115c, links B and C respectively, are members of a named linkset Lset2. This use of linksets is for illustrative purposes, and other configurations are possible. Signaling link 115c, link C, is shown to be connected to a signaling point within the SS7 network of the PSTN 110 with a point code "y". Signaling link 115d, link D, is shown to be connected to a signaling point within the SS7 network of the PSTN 110 with a point code "z". Signaling points at point codes "y" and "z" can, for example, be signal transfer points (STPs). Likewise, though not shown in FIG. 1B, the signaling links 115a and 115b can be connected to two other STPs, wherein the STP connected to link A, associated with Lset1, is the mated STP pair of the STP connected to link D, also associated with Lset1, and the STP connected to link B, associated with Lset2, is the mated STP pair of the STP connected to link C, also associated with Lset2. For example, the legacy switch can be a tandem switch. There may also be links directly connected to other signaling switching points, these can often be referred to 'F' links in some networks, in others they may simply be called direct links. In some examples where there are 'F.', or direct, links connected to adjacent signaling points, all 'F.', or direct, links are moved prior to the movement of any non 'F.', non direct, links.

FIG. 1C illustrates a first intermediate configuration of the system 100. In this configuration, the signaling links 115a and 115d are connected to the nodeA of signaling gateways 135a and 135b, respectively. Although physically connected, the links 115a and 115d are not active at this time. All of the signaling data for the point code "x" are transmitted via signaling links 115b and 115c. In one example, the signaling links are engineered for 40% continuous capacity (e.g., 0.4 erlangs), so that the temporary loss of 50% of capacity does not significantly interrupt the capability of the legacy switch 105 to handle all of its calls. Signaling links 115e and 115g replace the connections on the legacy switch 105 where the links 115a and 115d, respectively, were previously connected, and are connected to nodeB of the signaling gateways 135a-b, respectively. The labels "nodeA" and "nodeB" represent logical nodes and can be considered as instances of protocol stacks for the signaling gateways 135a-b. Following this physical reconfiguration, signaling links 115a, 115d, 115e, and 115g are validated via testing to ensure that no problems exist with the respective physical links. Once the signaling links 115a, 115d, 115e, and 115g are ready, they are activated so that signaling traffic flows through both the signaling gateways 135a-b and to the legacy switch 105. Once the signaling path through 135a-b is deemed reliable, signaling directly from the SS7 network of the PSTN 110 to the legacy switch 105 (e.g., via the links 115b and 115c) is terminated. With the initial introduction of the replacement switch system 125 into the signaling path, an operational choice may be possible to relocate an initial set of one or more of the VGCs 120a-h to the replacement switches 130a-d. This option is suppressed in FIGS. 1C, 1D and 1E, but can be introduced at any time (i.e., at any of the various intermediate configurations of the signaling links).

FIG. 1D illustrates a second intermediate configuration of the system 100. All of the initial signaling links 115a-d have been connected to the signaling gateways 135a-b. In this configuration, the signaling links 115a-d are active and all signals associated with point code "x" are transmitted through the signaling gateways 135a-b. The physical signaling gateways 135a-b may be realized as a single device for some implementations. It is shown here as separate devices to communicate a High Availability functionality that is often desirable of these devices in deployed configurations.

FIG. 1E illustrates a third intermediate configuration of the system 100. Additional signaling links 115f and 115h are introduced. These final signaling links connect from nodeC of the signaling gateways 135a-b, respectively, to the legacy switch 105, where the legacy switch 105 previously had connected signaling links 115b and 115c respectively. The nodeC is similar to the nodeB, except that it represents a different linkset. In this respect, more nodes are possible. The activation of signaling links 115f and 115h restores the entire signaling capacity of the legacy switch 105 to the SS7 network of the PSTN 110.

FIG. 1F illustrates a fourth intermediate configuration. An initial set of VGCs 120a-b and 120e-f are respectively connected to replacement switches 130a-d. The VGCs 120a-b and 120e-f are activated with the relocation of their interconnection to the replacement switches 130a-d.

FIG. 1G illustrates the final configuration. All of the VGCs 120a-h are connected to replacement switches 130a-d. The legacy switch 105 is no longer connected to the PSTN 110. As a final step, the signaling links 115e-h are removed from the replacement switch 125, and the legacy switch 10S is decommissioned.

Figure 2:
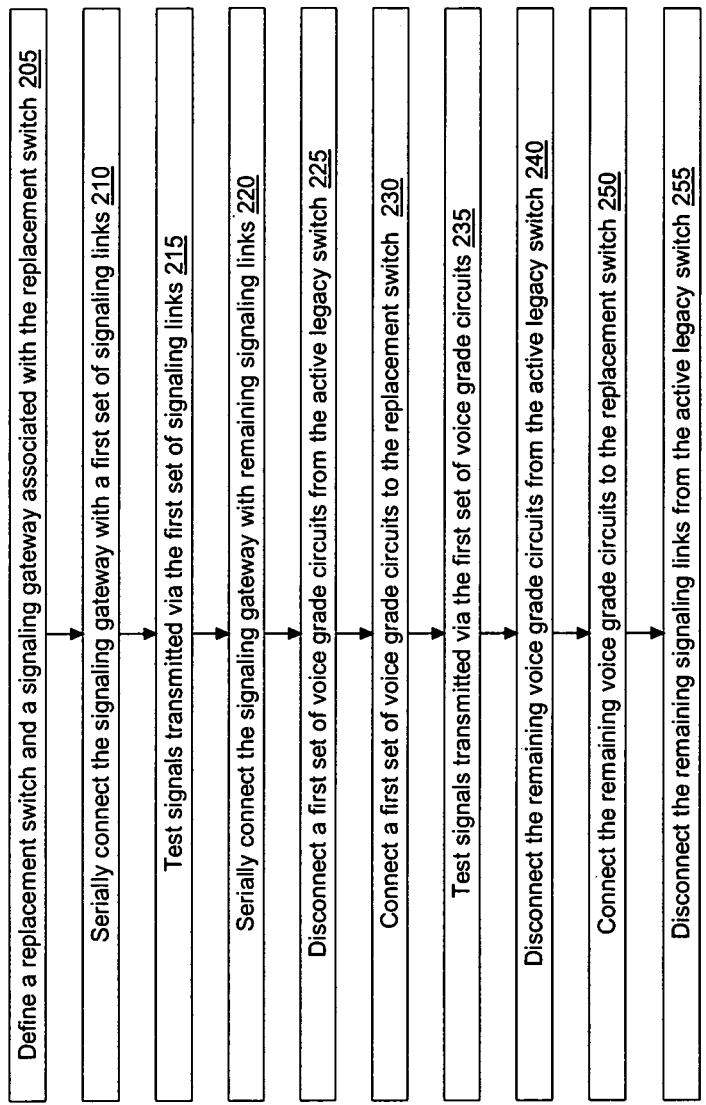
FIG. 2 is a block diagram showing a process for active switch replacement using a single point code.

FIG. 2 illustrates a process 200 used to take an initial configuration of the system 100 (e.g., FIG. 1A) and transform the system 100 to a final configuration (e.g., FIG. 1G). The process 200 uses only a single point code (e.g., the point code "x" assigned to the legacy switch 105) and keeps the legacy switch 105 active until all of the VGCs 120a-h are disconnected from the legacy switch 105. In process 200, a replacement switch and a signaling gateway associated with the replacement switch are defined (205). For example, in FIG. 1A the replacement switch system 125 includes replacement switches 130a-d and associated signaling gateways 135a-b.

To transform the system to the first, second, third and fourth intermediate configurations of FIGS. 1C-F, the signaling gateways 135a-b are serially connected with a first set of signaling links 115a and 115d from the plurality of signaling links 115a-d (210), which were initially connected to the legacy switch 105. In addition, this first set of signaling links include signaling links 115e and 115g. Signaling links 115e and 115g are introduced to connect the signaling gateways 135a-b with the legacy switch 105, where the links 115a and 115d, respectively, were previously connected. At first, the signaling links 115a, 115d, 115e, and 115g are physically connected, but not activated. At this point, all signaling traffic to the point code "x" is routed using the remaining signaling links 115b and 115c. Signals transmitted via the first set of signaling links are tested to ensure that no problems exist with the physical links 115a, 115d, 115e, and 115g (215).

Once the signaling links 115a, 115d, 115e, and 115g are ready, they are activated so that signaling traffic flows through the signaling links 115a, 115d, 115e, and 115g and the signaling gateways 135a-b. With the signaling links 115a, 115d, 115e, and 115g active, the signaling links 115b and 115c are deactivated and disconnected from the active legacy switch 105. The signaling gateways 135a-b are then serially connected with the remaining signaling links 115b and 115c (220). At this point, all four signaling links 115a-d are active again and the signaling data is traveling thorough the signaling gateways 135a-b. In the first and second and third intermediate configurations of FIGS. 1C-E, the signaling gateways 135a-b are connected to both the active legacy switch 105 (e.g., using signaling link connections 115e and 115g) and the replacement switches 130a-d (e.g., using the network 145). While all active VGCs 120a-h are connected to the active legacy switch 105, the signaling gateways 135a-b forward the signaling data to the active legacy switch 105.

While the signaling links 115a-d are being moved or after they have been moved from the active legacy switch 105 to the signaling gateways 135a-b, the VGCs 120a-h are moved from the active legacy switch 105 to the replacement switches 130a-d, in a piece-meal fashion. A first set of VGCs (e.g., 120a-b and 120e-f) are disconnected from the active legacy switch 105 (225) and connected to the replacement switches 130a-d (230). Signals transmitted via the first set of VGCs are tested to ensure that the physical connections are working properly (235). If the first set of voice grade circuits are working properly, then calls can be processed through the replacement switches 130a-d using the moved VGCs.

In one example (e.g., the third intermediate configuration of FIG. 1F), one set of VGCs (e.g., 120a-b and 120e-f) is moved from the active legacy switch 105 to the replacement switch 130a. Once this set of VGCs is working, then additional VGCs are moved. For example, in the fourth intermediate configuration of FIG. 1G, the VGCs 120c-d and 120g-h are moved from the active legacy switch 105 to the replacement switches 130a-d, respectively. In some examples, while a portion of the VGCs 120a-h are connected to the active legacy switch 105 and a portion are connected to the replacement switches 130a-d, the signaling gateways 135a-b forward the signaling data to the active legacy switch 105 or the replacement switches 130a-b based on the associated VGCs and/or the type of signaling data. Signaling data can be any data message that the network would generate over the signaling interface, and these include but are not limited to the LSSU's and MSU's provided for in the SS7 specifications, and include but are not limited to the signaling messages for MTP, ISUP, SCCP, TCAP, IUP, TUP, and higher layer protocols, such as CAP, IS41, GSM, and MAP. In this way both the legacy switch 105 and the replacement switches 130a-d are taking part in providing services for the assigned point code.

With the first set of VGCs active on the replacement switches 130a-d, the remaining VGCs are disconnected from the active legacy switch 105 (240) and connected to the replacement switches 130a-d (250). With all of the VGCs 120a-h connected to the replacement switches 130a-d, the signaling links are disconnected from the legacy switch 105 and the legacy switch 105 is deactivated (255).

Figure 3:
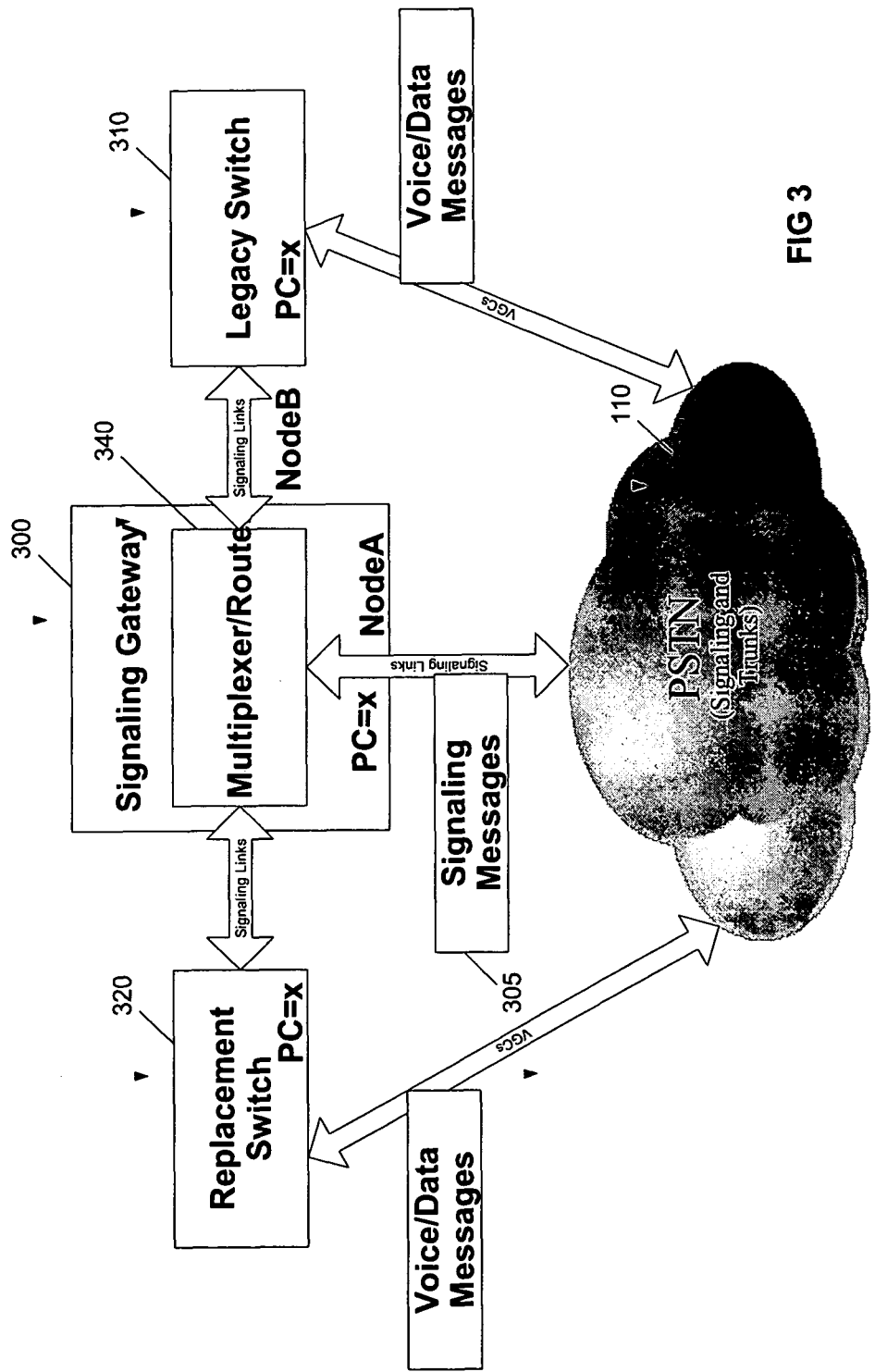
FIG. 3 is a block diagram showing a signaling gateway used for active switch replacement using a single point code.

FIG. 3 illustrates an overview of a signaling gateway 300 that can be used in an active switch replacement procedure, such as process 200, using a single point code. Once the signaling gateway 300 has been introduced into the signaling path between the SS7 network of the PSTN 110 and both the legacy switch 310 and the replacement switch 320, the signaling gateway 300 can provide various services. One service is the ability to discriminate signaling messages 305 received from the SS7 network of the PSTN 110, based on the associated VGCs/routing context and/or the type of signaling data/service identifier. SS7 MSU's are defined by the SS7 specification as messages that are have destinations at or above the MTP layer 3 level. These messages are identified by their Service Information Octet (SIO) contained within the MSU. Each protocol that binds directly to the MTP layer of the protocol stack can be identified directly by the one to one association of this Service Information Octet to the protocol identified at or above MTP layer 3. For example the values of 0, and 1 are MTP related, 3 is for SCCP and protocols above the SCCP layer such as TCAP, CAP, IS41, GSM, MAP and others, while the value of 4 is allocated to either IUP or TUP depending on the network operator's choice, while the value of 5 is allocated to ISUP, while the value of 6 and 7 are allocated to DUP. All other values within the valid protocol range of the SIO are spare or reserved at this time, based on the protocol specification as defined by the controlling bodies, for example the ITU and ANSI. Based on the signaling message 305, the signaling gateway 300 directs/routes those signaling messages 305 either to the legacy switch 310 or the replacement switch 320. In this example, the signaling gateway 300 includes a multiplexer/router function 340 to direct the signaling messages 305.

Another service of the signaling gateway 300 is to present to the legacy switch 310 a network presence that appears as the PSTN 110 for all directly connected signaling interfaces. For example, the signaling gateway 300 will appear to the legacy switch 310 as the first STP connected to the signaling gateway 300 or as one of the other destinations in a particular routing set. In addition, the signaling gateway 300 provides the legacy switch 310 with indications of network management (e.g., link status signal units (LSSUs), transfer prohibited (TFP) messages, and the like) from the PSTN 110 while suppressing like indications directed toward the PSTN 110 originating from the legacy switch 310.

In the routing context, the signaling gateway 300 provides a dynamic capability that is managed while the services are migrated from the legacy switch 310 to the replacement switch 320. With this functionality, the signaling gateway 300 can be defined using a single point code. This advantageously allows the replacement switch 320 to be brought into service without the need to obtain another point code. As this management capability is dynamic, the signaling gateway 300 can also reverse any one procedure in order to allow restoration of services to the legacy switch 310 at any point of a replacement procedure (e.g., process 200) prior to completion of the replacement and removal of the legacy switch 310. The multiplexer/router function 340 is only needed while both the legacy switch 310 and the replacement switch 320 are both in use and can be removed when the legacy switch 310 is no longer being used.

To provide the capabilities described herein using a single point code, a signaling gateway (e.g., 135a, 135b, or 300) can use a multi-node approach. In this case, shown in FIG. 3, the node of the signaling gateway 300 facing the PSTN 110, labeled nodeA, is given the point code originally held by the legacy switch 310, "x" in this example. As such, the signaling gateway 300 is presenting both the legacy switch 310 and the replacement switch 320 to the PSTN 110 via the same point code "x". The point codes of the legacy switch 310 and the replacement switch 320 remain given as "x" as well, making the signaling gateway 300 virtually transparent to signaling messages 305. The node of the signaling gateway 300 facing the legacy switch 310, labeled nodeB, presents to the legacy switch 310 the appearance of the PSTN 110, for example the first signaling transfer point (STP) connected to the signaling gateway 300 or as one of the other destinations in a particular routing set. Consider the two nodes, labeled nodeA and nodeB, as being an actual node and a "phantom node," respectively. The actual node, nodeA, is the node that is connected to the actual SS7 network of the PSTN 110. This node is configured with a single point code, the original point code of the legacy switch 310. The "phantom node" is the node facing the legacy switch 310 being decommissioned. These two nodes may co-exist within the deployment of other nodes if necessary.

Figure 4A:
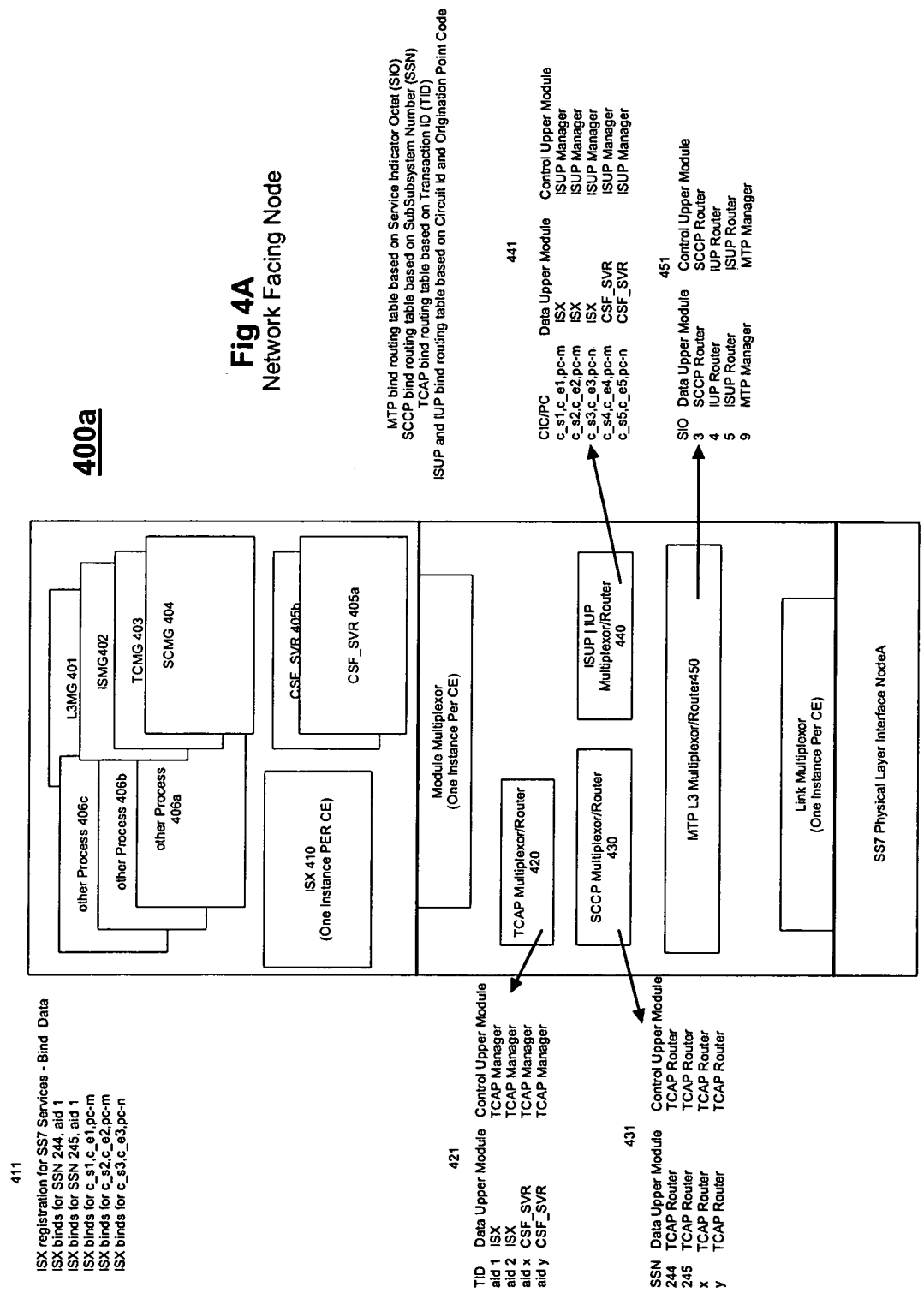

FIGS. 4A and 4B illustrate logical representations of this multi-node approach. A logical node can be considered an instance of a protocol stack, and the assignment of a point code. FIG. 4A represents the instance of a protocol stack 400a for nodeA, the node facing the SS7 network of the PSTN and representing the point code of the switches, "x" in this example, to the PSTN. FIG. 4B represents the instance of a protocol stack 400b for nodeB, the node facing the legacy switch and representing the PSTN to the legacy switch. The instances of protocol stacks 400a and 400b illustrated in FIGS. 4A and 4B can be used by a signaling gateway (e.g., 135a, 135b, or 300). If a plurality of signaling gateways is in operation, then each signaling gateway uses their own instances of 400a and 400b. For example, the processes, 401, 402, 403, 404, 405a-b, 406a-c in FIG. 4A and in FIG. 4B the processes, 491, 492, 493, 494, and 496a-c have one instance per computing element (CE), depicting that there is one instance for each signaling gateway (e.g., 135*a*, 135*b*, or 300) per the node (as depicted by the NodeA, NodeB or NodeC binding). For example, the process 410 shown in both FIG. 4A and in FIG. 4B is the same process on an instance of the CE, independent of the NodeA, NodeB or NodeC binding. This one instance of the ISX process binds to NodeA and NodeB, and optionally to NodeC simultaneously. The modules in FIG. 4A, for example, 420, 430, 440, and 450 each are their own instances per CE, and may or may not share code space and or data space with the same instances shown in FIG. 4B. This is an implementation decision. The two modules of the Module Multiplexor and Link Multiplexor shown in FIGS. 4A and 4B are depicted as having a single instance per CE. This is to allow a single entry and exit point for signaling messages as they flow up and down the implementation of the protocol.

In FIG. 4A, the signaling gateway includes multiple processes in a protocol stack 400*a*. Included in 400*a* is a Level 3 Manager (L3MG) process 401 that is a Message Transfer Part Level 3 (MTP L3) protocol module that, in general, can handle the basic data transfer mechanisms for all SS7 User Parts and Application Parts. Included in the protocol stack 400*a* is an Integrated Services Digital Network (ISDN) Manager (ISMG) process 402 that manages ISDN User Part (ISUP) protocol and procedures used to set-up, manage, and release trunk circuits (e.g., VGCs 120*a-h*) that carry voice and data calls over the PSTN. Included in the protocol stack 400*a* is a Transaction Capabilities Application Part (TCAP) Manager (TCMG) process 403 that manages TCAP protocol and procedures used to support the exchange of non-circuit related data between applications across an SS7 network using the Signaling Connection Control Part (SCCP) service. Included in the protocol stack 400*a* is a SCCP Manager (SCMG) process 404 that manages SCCP protocol and procedures used to provide connectionless and connection-oriented network services and global title translation (GTT) capabilities above MTP L3. Included in the protocol stack 400*a* are Client Server Feature Server (CSF_SVR) processes 405*a* and 405*b*. Processes 405*a*, 405*b*, and any other CSF_SVR process are the processes that provide the interface from the lower layer streams modules to the newly introduced switch. These processes may bind for ISUP, IUP, SCCP (TCAP) messages at the lower protocol level, and may register for specific CIC ranges for ISUP and IUP, or may register for specific SSN's for the SCCP (TCAP and above) protocols. These server processes provide an interface between the Signaling Gateway, and the switch fabric for circuit related messages (ISUP or IUP), or policy servers that perform SCCP based processing. These processes provide the routing of traffic as services and circuits are moved off the legacy switch (and hence out of the ISX process), and onto the newly introduced switching equipment. Other processes 406*a*, 406*b*, and 406*c* are included in the protocol stack 400*a* and represent any other processes that can be used to support a signaling gateway connected to the SS7 network of the PSTN 110. Some examples of these other processes are ISUP management and support processes, SCCP management processes, MTP management and support processes, IUP management processes, TCAP management and support processes, node and platform management processes, timer and health watch and checking processes, user interface processes for command and graphical display, inter CE communication processes, measurement processes, and others.

Another process included in the protocol stack 400*a* is an Interworking Signaling eXchange (ISX) process 410. As described in more detail below, the ISX process 410 manages the signaling data received from the nodes (e.g., nodeA, nodeB, or others). For example, the ISX process 410 ensures that a signaling message received from the PSTN facing node (e.g., nodeA) is directed to the correct process in the protocol stack, depending on whether the signaling message is destined for the legacy switch (e.g., 105) or the replacement switch (e.g., 125).

The protocol instance of the PSTN facing node (e.g., nodeA) registers for service indicators and routing context in received signaling messages (a process that is described as 'bind' or 'binding') at a protocol level high into the protocol stack. This binding is specific to the routing context for the protocol level. For example, the ISX process 410 binds for TCAP messages with a specific Sub System Number (SSN) (for example, 244) and provides a unique application identifier associating the messages to the process instance of the ISX process 410. Other binding examples can include the ISX process 410 binding for SSN 244 and application ID (aid) 1, the ISX process 410 binding for SSN 245 and aid 1, and/or the ISX process 410 binding for a CIC within a first range of CICs given by a starting CIC, represented as $c\_s1$, an ending CIC, represented as $c\_e1$, and a point code "m", for example, of the signaling point associated with the switch connected to the range of CICs defined by $c\_s1$ to $c\_e1$, represented as pc-m. The ISX process 410 can bind for a second range of CICs for the same switch, point code "m", represented by a starting CIC, $c\_s2$, and an ending CIC, $c\_e2$. The ISX process 410 can also bind for a third range of CICs, represented as $c\_s3$, $c\_e3$ for a different switch, for example with point code "n", which, being a different point code, can include the same numerical values as the first and/or second range of CICs associated with the point code "m". The point codes "m" and "n" represent alias point codes used by the ISX process 410 to correctly route the signaling messages.

Similarly, other TCAP based data processes may bind for the same SSN and provide a different application identifier (aid #). A TCAP multiplexer/router module 420 tracks and maintains the routing context, which may be dynamic. Further, the process ISX 410 may bind for multiple SSNs and is limited only by the range of available SSNs. Other TCAP data processes are similarly capable of binding for multiple SSNs. For purposes of illustration, a TCAP router bind table 421 and a SCCP router bind table 431 are shown. The TCAP router bind table 421 maintains dynamic registration for both data and control aspects of the TCAP protocol. A SCCP multiplexer/router 430 maintains bind data for the SSN for both the control and data for this node that are directed to the TCAP router for distribution.

An ISUP multiplexer/router 440 maintains a bind table 441 for the ISUP protocol. A similar router, (e.g., an IUP router) may be present in an ITU-T variant of SS7 networks and is similar to the ISUP routing and table descriptions, with the exception that the SIO is different. The ISUP multiplexer/router 440 maintains the bind table 441. This table can include multiple ranges of CICs, defined by a starting CIC and an ending CIC (e.g., noted as $c\_s<\#>$ and $c\_e<\#>$, respectively in the table 441). The table 441 also associates a point code with each range of CICs (e.g., the SS7 network point code of the connected switch at the other end of the VGC). The combination of a specific CIC and a point code (PC) (e.g., noted as pc-<m or n>) provides a unique address for the associated VGC. The table 441 also includes an identifier that provides direct association to the consuming data and control processes. The table 441 may have many disassociated entries for the same or different consuming data and control processes. There is a difference between the ISUP/IUP table 441 and the TCAP table of 421. The ISUP/IUP table 441 has, if a plurality of ranges exist for a particular point code, unique and non-overlapping c_s<#>-c_e<#> ranges for said particular point code. So, where the TCAP table 421 allows multiple consumers of the same SSN, the ISUP/IUP table allows only one active consumer for any specific CIC/PC combination. A MTP L3 multiplexor/router module 450 maintains a bind table 451. The bind table 451 provides that specific SIOs have been bound by the upper layer protocol router for this node.

By virtue of the binding information in these various tables, SS7 messages received over the SS7 signaling links from the PSTN are routed via the multiplexing router modules to the bound data or control processes according to the bind table information (e.g., via module 440 to application space processes, and/or via module 430 to module 420 and then via module 420 to application space processes).

In FIG. 4B, the protocol instance 400b of the legacy switch facing node (e.g., nodeB or nodeC), registers for service indicators and routing context (a process that is described as 'bind' or 'binding') at a protocol level one module lower into the protocol stack than nodeA, the PSTN facing node. This binding is specific to the routing context for the protocol level The processes in FIG. 4B are different instances of the processes in FIG. 4A by the same name, for example the ISMG process 402 in FIG. 4A may be a difference executing image of the same computer program, as the ISMG process 492 in FIG. 4B. The difference is that these instances are now associated with a different node (nodeB or nodeC, rather than nodeA), and these nodes have a different Own Point Code assigned, and that the underlying CE operating system is aware of, and manages the differences in the processes. These processes are responsible for the operation and management of the protocol stack facing the direction of the legacy switch, and not facing the network. These processes in FIG. 4B may differ from the processes in FIG. 4A for example in the data storage associated with the operation of an executing compute program. Or these process may differ from the processes in FIG. 4A in the instance of the execution of a light weight process under control of a threaded operating system. For example, the ISX process 410 binds for SCCP messages with a specific SSN (for example, 244) and provides a unique application identifier associating the messages to the process instance of the ISX 410 (this is the same process instance as in FIG. 4A). Since this is a node facing the legacy switch, no other TCAP based data processes exist for this node. The SCCP multiplexor/router module 470 tracks and maintains the routing context, which may be dynamic. Further, the ISX 410 process may bind for multiple SSNs and is limited only by the range of available SSNs. For purposes of illustration, a SCCP router bind table 471 is shown and is different from the table 431 shown in FIG. 4A. Although the tables are different, the code space and/or the code and data space of the module 470 may be either different or the same as the module 430 shown in FIG. 4A. The SCCP multiplexor/router 470 maintains bind data for the SSN. Both the control and data for this legacy switch facing node are directed to the bound application space data and control processes. The MTP L3 multiplexor/router module 480 maintains the 481 bind table. The ISX process 410 binds directly with this router for consumption of all ISUP and possibly IUP data and control message signal units (MSUs) that are received via the legacy switch facing signaling links. The ISUP|IUP multiplexor/router takes no part in the message flow of these messages from the legacy switch. In the case where there are two or more phantom nodes, the representation of FIG. 4B is duplicated for each of the phantom nodes that may face the legacy switch. In such examples, each legacy switch facing node has an alias PC that represents one of the original connected STP PC's.

By virtue of the binding information in these various tables, SS7 messages received over the SS7 signaling links from the PSTN are routed via the multiplexing router modules for the specific node, (e.g., via module 440 to application space processes, or via module 430 to module 420 and then via module 420 to application space processes) to the bound data or control processes according to the bind table information. Similarly SS7 signaling received on links connected between the legacy switch and the signaling gateway flow according to the logic maintained in the 481 MTP and 471 SCCP tables associated with the alias nodes.

Figure 5A:
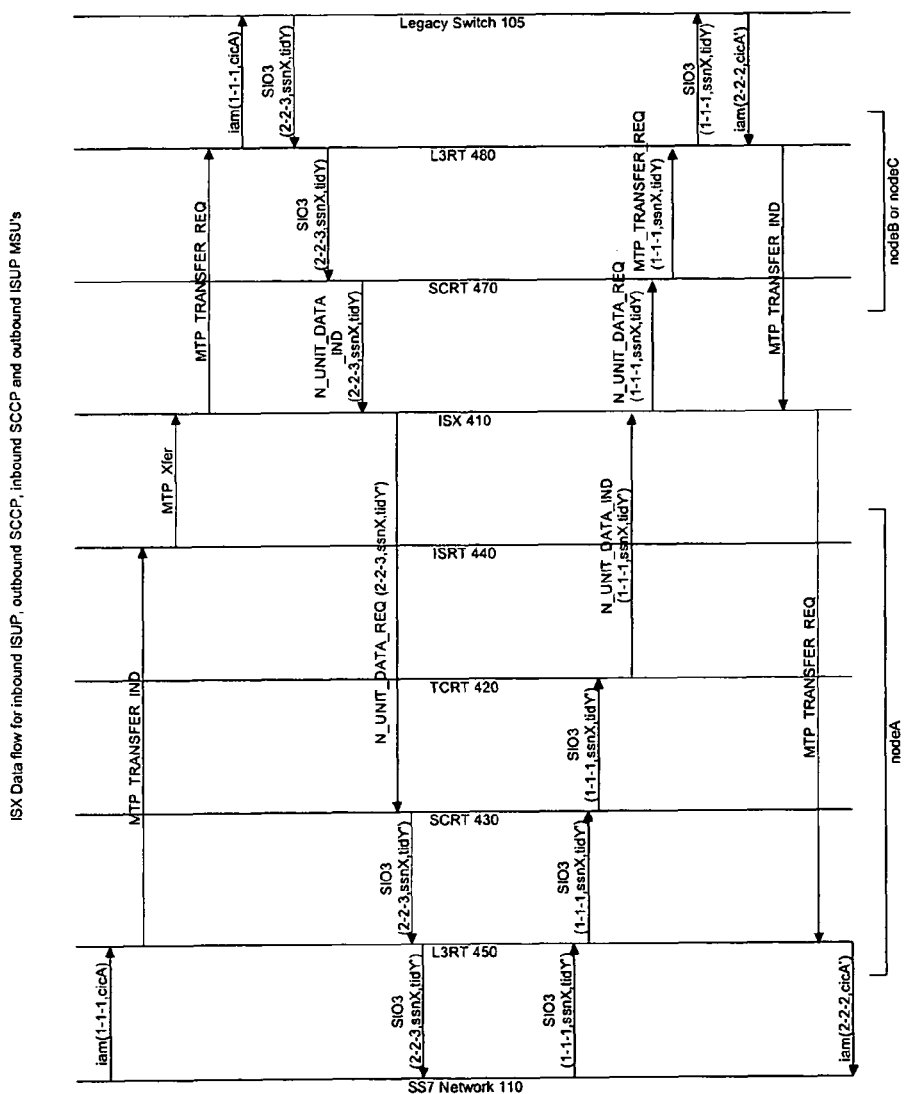
FIG. 5A-C are signaling ladder diagrams showing signaling traffic path through the protocol stacks of a signaling gateway used for active switch replacement using a single point code.

FIG. 5A illustrates the logical flow of a representative set of ISUP IAM messages from the SS7 network of the PSTN 110 to the legacy switch 105 (with a point code of 1-1-1 and a CIC A in this example), where the legacy switch 105 has bound for the CIC/PC. In this example the legacy switch 105 also originates a TCAP transaction in the direction of the PSTN 110 using a unique SSN. The ladder diagram begins by the receipt of an LAM message, directed toward point code 1-1-1, by the MTP L3 router (L3RT) 450 of nodeA, which appears as point code 1-1-1 to the SS7 network 110. The L3RT 450 determines, based on table 451, that an IAM message is an ISUP message (SIO5) and routes/transfers the message to the ISUP router (ISRT) 440 of nodeA using a protocol primitive of MTP_TRANSFER_IND message. These primitives are defined by the various telecommunication standards, where the MTP_TRANSFER_IND, is a MTP MSU being transferred in a direction from the lower layer protocol stack (MTP) to an upper layer consumer. The 'IND' contained within the protocol primitive is the discriminator that communicates direction. 'IND' is short for indication. Other protocol primitives may have the 'REQ' at the end. These are messages that are defined by the standards bodies as flowing from an upper layer protocol unit toward a lower layer protocol unit and the 'REQ' is short for request. Other protocol primitives may have a RSP or RESP, and CNF or CONF, which stand for response and conformation and flow from the top and bottom of the protocol stack respectively. The ISRT 440 uses the CIC and point code and routes/transfers, based on table 441, the message to the ISX process 410 in a MTP_Xfer message. The ISX process 410 routes a MTP_TRANSFER_REQ message to the L3RT 480 of nodeB, which passes the original ISUP IAM message, unaltered, to the legacy switch 105. Because the ISX process 410 receives the IAM from nodeA and the point code is the same point code as nodeA (e.g., the point code of the signaling gateway), the ISX process 410 directs the message to nodeB or nodeC. Either nodeB or nodeC can be used based on balancing requirements.

Upon receipt of the ISUP IAM message, the legacy switch 105 originates a TCAP transaction with a SIO of 3 and addressed to SSN "X", and sends the message to nodeB of the signaling gateway. In this example, the point code 2-2-3 is the destination point code (DPC) of an SCP. The L3RT 480 of nodeB receives the TCAP message and, based on table 481, routes/transfers the message to the SCCP router (SCRT) 470 of nodeB. The SCRT 470, based on table 471 that indicates data goes to the ISX process 410, routes the message to the ISX process 410 using a N_UNIT_DATA_IND message. The SCCP protocol stack defines different protocol primitives from those of MTP discussed above. The SCCP protocol defines a N_UNIT_DATA protocol primitive in both the upward and downward direction through the protocol stack. The N_UNIT_DATA_IND is a SCCP protocol primitive moving in the upward direction through the protocol stack, while the N_UNIT_DATA_REQ is a SCCP protocol primitive containing SCCP data that is moving from an upper layer protocol element in the direction of the lower layers of the protocol stack. The ISX process 410 then transfers the N_UNIT_DATA_REQ message to the SCRT 430 of nodeA, which subsequently relays the message to the L3RT 450. The L3RT 450 sends the message to the SS7 network 110. A response to the TCAP message, possibly sent by a SCP, and directed toward point code 1-1-1 is next received by the L3RT 450 of nodeA from the SS7 network 110. Based on table 451 and an SIO value of 3, the L3RT 450 transfers/routes the message to the SCRT 430. The SCRT 430, based on table 431 and the SSN, transfers/routes the message to the TCRT 420. The TCRT 420, based on table 421 and a data message, routes the N_UNIT_DATA_IND message to the ISX process 410. The ISX process 410 transfers the N_UNIT_DATA_REQ message to the L3RT 480 of nodeB, which then relays the message to the legacy switch 105.

Once the legacy switch 105 has received a response to its TCAP transaction, the legacy switch 105 completes the establishment of a call by transmitting an ISUP IAM message. The legacy switch 105 sends an ISUP IAM message directed to point code 2-2-2, CICA'. This message is received by the L3RT 480 of nodeB of the signaling gateway. The L3RT 480, based on table 481, routes/transfers the MTP_TRANSFER_IND message on to the ISX process 410.

The ISX process 410 transfers the MTP_TRANSFER_REQ message on to the L3RT 450 of nodeA, which subsequently sends the LAM message to the SS7 network 110.

Figure 5B:
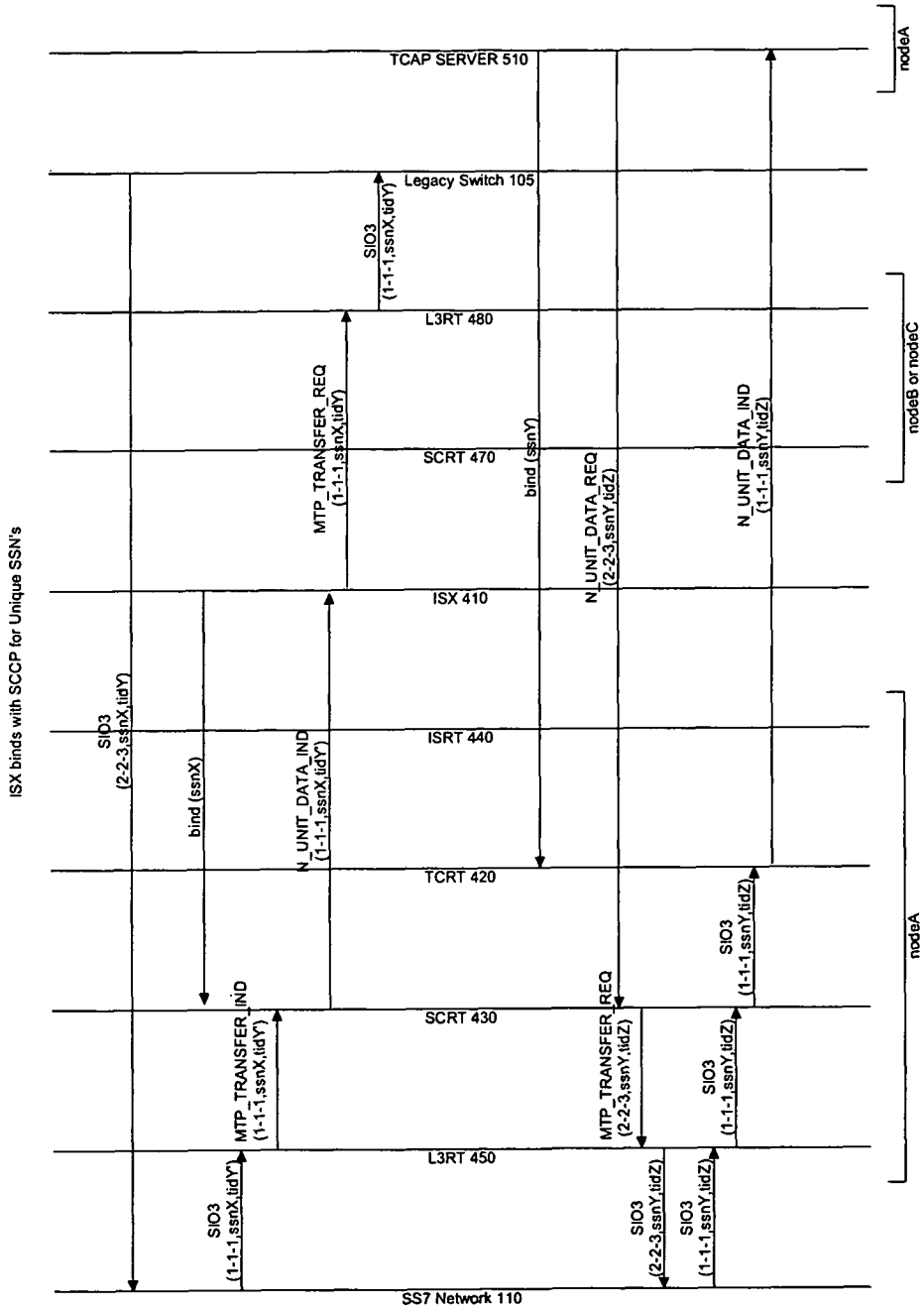

FIG. 5B illustrates the logical flow of a representative set of messages for SCCP or TCAP where the legacy switch has bound for a unique SSN. The legacy switch 105 generates a SCCP request SIO3 message, which the legacy switch 105 sends to the SS7 network 110. The request is directed to a point code 2-2-3, with a sub-system number (SSN) X and a transaction ID (TID) of Y. Some time, either before or after the SIO3 message is sent, the ISX process 410 registers, using for example a bind method, the SSN X with the TCMG 403 for data messages. This binding causes the TCMG 403 to communicate this bind information to the TCRT 420. The TCRT 420 will update the table 421 with the aid if the ISX module, and enter data and control bind information into the table. The SCRT 430 is also notified of this bind information, and will update the table 431 to reflect that the SSN that the ISX process registered for (SSN X in this example) is entered into the 431 table, and that the consumer for this data is the TCRT 420. For example, upon receipt of the bind method, the table 431 is updated so that in the row where X is the SSN, under the column Data Upper Module, the value of TCAP Router is changed to ISX.

When a response to the SIO3 message comes back from the SS7 network 110 with a point code of 1-1-1, the SIO3 message is routed to the L3RT 450 of nodeA. Based on an SIO value of 3, using table 451, the SIO3 message is routed to the SCRT 430. Now that table 431 has been update due to the Bind method, the message is routed to the SCRT 430 module, and the SCRT module using table 431 routes this message to the TCRT 420 module, finally the TRCR 420 module, using table 421 routes this to the aid of the ISX process 410 using a N_UNIT_DATA_IND message. The ISX process 410 routes the messages to the L3RT 480, which in turn routes the message to the legacy switch 105. In some examples, the ISX process 410, by design within the control logic of the application, detects the node (nodeA, nodeB, or nodeC) on which the inbound MSU was received. Using this information within the implementation the ISX process 410 will switch on this inbound node information to determine the outbound node. In conjunction with this information the protocol primitive is used to determine the module which is to be sent this MSU for further processing.

Also shown in FIG. 5B is a TCAP server 510, which registers, using for example a bind method, the SSN Y with the TCRT 420 for data messages. The TCAP server can be an example of a CSF_SVR process, dealing with TCAP, as shown in 405<x> of FIG. 4A. With this binding, the TCRT 420 can now route based on a specific SSN, and route upward bound protocol messages to the associated process which originated the transaction by virtue of tracking the aid within the table and the received message. This should be noted, since table 421 of FIG. 4A does not include a SSN for use in routing, though as described here, other parameters can be used in table 421 as well as any of the other tables which may provide this routing information to the TCRT 420. Some time, either before or after the bind method is invoked, the TCAP server generates a SCCP request SIO3 message, which the TCAP server 510 sends to the SCRT 430.

The SCRT 430 on receipt of a message from an upper layer protocol element will continue to process the message in the direction of the SS7 network by design. The request is directed to a point code 2-2-3, with a sub-system number (SSN) Y and a transaction ID (TID) of Z.

When a response to the SIO3 message comes back from the SS7 network 110 with a point code of 1-1-1, the SIO3 message is routed to the L3RT 450 of nodeA. Based on an SIO value of 3, using table 451, the SIO3 message is routed to the SCRT 430. Because the SSN is Y (e.g., and not X, the only SSN for which the ISX process bound in this figure), the SCRT 430 routes the message to the TCAP Router 420, using table 431. The TCRT 420, using the update from the bind method above, routes this message to the TCAP server 510.

Figure 5C:
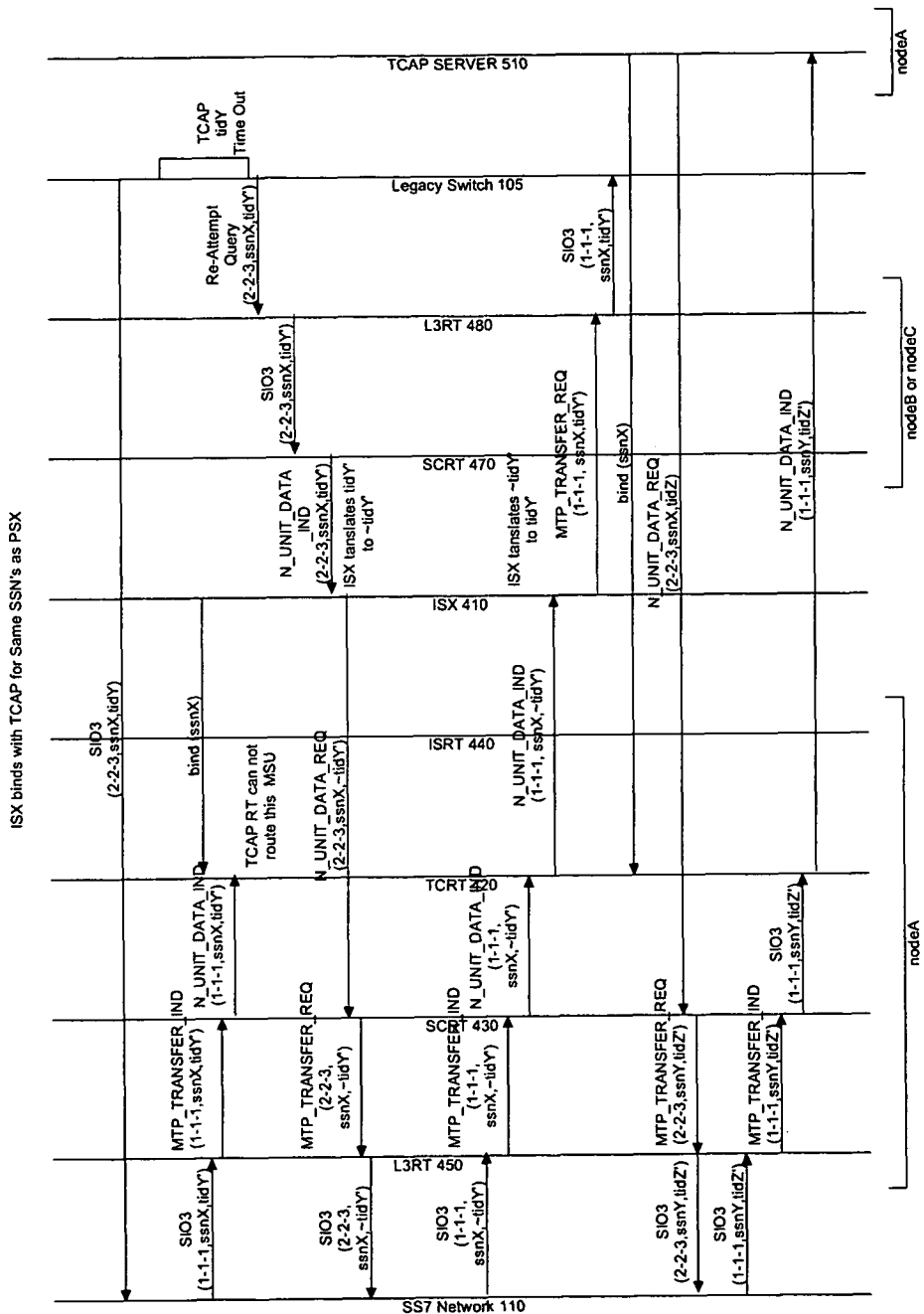

FIG. 5C illustrates the logical flow of a representative set of messages for SCCP or TCAP where the legacy switch 105 has bound for a SSN that is also to be used by the replacement switch 125. In this case the ISX process 410 performs a translation of the transaction id that is encoded within the actual TCAP message format. Similarly the ISX process 410 performs a reverse translation once responses have been received from the PSTN 110 prior to forwarding these messages on to the legacy switch 105.

The legacy switch 105 generates a SCCP request SIO3 message, which the legacy switch 105 sends to the SS7 network 110. The request is directed to a point code 2-2-3, with a sub-system number (SSN) X and a transaction ID (TID) of Y. Some time, either before or after the SIO3 message is sent, the ISX process 410 registers, using for example a bind method, the SSN X with the TCRT 420 for data messages. When a response to the SIO3 message comes back from the SS7 network 110 with a point code of 1-1-1, the SIO3 message is routed to the L3RT 450 of nodeA. Based on an SIO value of 3, using table 451, the SIO3 message is routed to the SCRT 430. The SCRT 430 routes the message, using table 431, to the TCRT 420. In this case the TCRT 420 cannot route the MSU. This is because upward bound response messages received by the TCRT are (as a result of the protocol's requirements) associated with the aid of the process that sent the originating request message, and in this case the original request message was sent directly from the legacy switch (prior to the introduction of the signaling gateway into the signaling network path), and the aid of the legacy switch is unknown and uncorrelated to any aid present it table 421. Because the routing of the message is halted, the TCAP TID Y times out on the legacy switch 105 and the legacy switch 105 generates an second SIO3 query with a TID Y'.

Because the second SIO3 query with a TID Y' comes from the legacy switch 105, the second SIO3 query is routed to the ISX process 410. Because this query is associated with the SSN X to which the ISX process 410 has been bound, the ISX process 410 transforms the TID of the query from TID Y' to ~TID Y' so that the TCRT 420 can identify this specific transaction as being associated with the ISX process 410. The ISX process routes the query with the translated transaction to the SCRT 430. The SCRT 430 routes the message to the L3RT 450, which routes the message to the SS7 network 110.

When a response to the SIO3 message comes back from the SS7 network 110 with a point code of 1-1-1, the SIO3 message is routed to the L3RT 450 of nodeA. Based on an SIO value of 3, using table 451, the SIO3 message is routed to the SCRT 430. Because the SSN is X, the SCRT 430 routes the message to the TCAP Router 420, using table 431. The TCRT 420, using the translated ~TIDY', routes this message to the ISX process 410. The ISX process 401 translates the TID back to Y' and routes the message to the legacy switch 105.

In the case where there are other TCAP data users on the signaling gateway, additional TCAP data processes may come into scope, and execute. The TCAP process 510 may represent one of many such processes. The TCAP process 510 may be implemented to initialize as described above for the ISX process 410, and may or may not bind for the same SSN as the ISX process 410. Operating as a TCAP data process, the TCAP server 510 generates a SIO3 message, which the TCAP server 510 sends to the SS7 network 110. The request is directed to a point code 2-2-3, with a sub-system number (SSN) X and a transaction ID (TID) of Z. Some time, either before or after the SIO3 message is sent, the TCAP server 510 registers, using for example a bind method, the SSN X with the TCRT 420 for data messages. When a response to the SIO3 message comes back from the SS7 network 110 with a point code of 1-1-1, the SIO3 message is routed to the L3RT 450 of nodeA. Based on an SIO value of 3, using table 451, the SIO3 message is routed to the SCRT 430. The SCRT 430 routes the message, using table 431, to the TCRT 420. The TCRT 420, using the update from the bind method above, routes this message to the TCAP server 510. In this way the signaling gateways 135a-b can support both the TCAP needs of the legacy switch being replaced, and the newly introduced switch.

Although the above examples describe using a single point code to represent multiple switching devices in a switch replacement context, the invention is not limited to this sole use. There are other uses of multiple software nodes to enable multiple switches behind a single point code and the invention contemplates other such uses.

The invention herein described also can be implemented in the following ways, but in each case the listed implementations are not meant to limit the scope of how the invention can be otherwise implemented. The above-described techniques can be implemented in digital electronic circuitry, or in computer hardware, firmware, software, or in combinations of them. The implementation can be as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps can be performed by one or more programmable processors executing a computer program to perform functions of the invention by operating on input data and generating output. Method steps can also be performed by, and an apparatus can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Data transmission and instructions can also occur over a communications network. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in special purpose logic circuitry.

The terms "module" and "function," as used herein, refer to, but are not limited to, a software or hardware component which performs certain tasks. A module may advantageously be configured to reside on addressable storage medium and configured to execute on one or more processors. A module may be fully or partially implemented with a general purpose integrated circuit (IC), FPGA, or ASIC. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. Additionally, the components and modules may advantageously be implemented on many different platforms, including computers, computer servers, data communications infrastructure equipment such as application-enabled switches or routers, or telecommunications infrastructure equipment, such as public or private telephone switches or private branch exchanges (PBX). In any of these cases, implementation may be achieved either by writing applications that are native to the chosen platform, or by interfacing the platform to one or more external application engines.

To provide for interaction with a user, the above described techniques can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The above described techniques can be implemented in a distributed computing system that includes a back-end component, e.g., as a data server, and/or a middleware component, e.g., an application server, and/or a front-end component, e.g., a client computer having a graphical user interface and/or a Web browser through which a user can interact with an example implementation, or any combination of such back-end, middleware, or front-end components. The components of the system can be interconnected by any form or medium of digital data communications, e.g., a communications network. Examples of communications networks include a local area network ("LAN") and a wide area network ("WAN"), e.g., the Internet, and include both wired and wireless networks. Communications networks can also include all or a portion of the PSTN, for example, a portion owned by a specific carrier.

The computing system can include clients and servers. A client and server are generally remote from each other and typically interact through a communications network. The relationship of client and server arises by virtue of computer programs running on the respective computers and having a client-server relationship to each other.

The invention has been described in terms of particular embodiments. The alternatives described herein are examples for illustration only and not to limit the alternatives in any way. The steps of the invention can be performed in a different order and still achieve desirable results. Other embodiments are within the scope of the following claims.

What is claimed is:

1. A signaling gateway using a single point code to represent multiple switching devices, the signaling gateway being serially connected between a first switch and a PSTN, the signaling gateway comprising:
   a first software node assigned the single point code, the first software node appearing to the PSTN as an endpoint to the PSTN;
   a second software node connected to the first switch;
   a software process module connected to the first software node and the second software node; and
   a multiplexer that:
      receives, via the first software node, signaling data associated with a circuit and comprising the single point code;
      assigns, via the software process module, a first internal point code to the first software node and a second internal point code to the second software node
      determines, via the software process module, whether the first switch or a second switch is associated with the circuit; and
      routes the signaling data from the software process module to (i) the second software node using the second internal point code, the second software node appearing to the first switch as a first signal transfer point of the PSTN, if the first switch is associated with the circuit or (ii) the second switch, assigned the single point code and connected to the multiplexer, if the second switch is associated with the circuit.

2. The signaling gateway of claim 1, wherein the circuit comprises a voice trunk.

3. The signaling gateway of claim 1, wherein the circuit is associated with a signal type.

4. A method for using a single point code to represent multiple switching devices, the method comprising:
   receiving, via a first software node of a signaling gateway, signaling data associated with a circuit and comprising the single point code, wherein the first software node is assigned the single point code and the first software node appears to the PSTN as an endpoint to the PSTN;
   assigning, by a software process module of the signaling gateway, a first internal point code to the first software node and a second internal point code to a second software node of the signaling gateway;
   determining, by the software process module, whether a first switch or a second switch is associated with the circuit; and
   routing, by the software process module, the signaling data to:
      (i) the second software node using the second internal point code, wherein the second software node is connected to the first switch assigned the single point code and the second software node appears to the first switch as a first signal transfer point of the PSTN, if the first switch is associated with the circuit, or
      (ii) the second switch, assigned the single point code, if the second switch is associated with the circuit.

5. The method of claim 4, wherein routing the signaling data is based on the type of the signaling data.

6. The method of claim 4, wherein routing the signaling data is based on the type of the signaling data and specific message data contained within the signaling data.

7. A method for using a single point code to represent multiple switching devices, the method comprising:
   assigning the single point code to a first software node of a signaling gateway;
   connecting the first software node to a PSTN and a second software node of the signaling gateway to a first switch, wherein the first software node appears to the PSTN as an endpoint to the PSTN and the second software node appears to the first switch as a first signal transfer point of the PSTN;
   assigning a first internal point code to the first software node and a second internal point code to the second software node;
   receiving, via the first software node, signaling data associated with a circuit and comprising the single point code;
   determining, by the signaling gateway, whether the first switch or a second switch is associated with the circuit; and
   routing, by the signaling gateway, the signaling data to (i) the second software node using the second internal point code if the first switch is associated with the circuit or (ii) to the second switch, assigned the single point code, if the second switch is associated with the circuit.

8. The method of claim 7, wherein routing the signaling data is based on the type of the signaling data.

9. The method of claim 7, wherein routing the signaling data is based on the type of the signaling data and specific message data contained within the signaling data.

10. The method of claim 7, wherein the circuit comprises a voice trunk associated with the single point code.

11. The method of claim 7, further comprising assigning the single point code to a third software node and connecting the third software node to the first switch.

12. The method of claim 11, further comprising routing the signaling data to the second software node or the third software node based on a load balancing technique.

13. A computer program product, tangibly embodied in a machine-readable storage device of a signaling gateway, for using a single point code to represent multiple switching devices, the computer program product including instructions being operable to cause data processing apparatus to:
- receive, by a first software node of the signaling gateway, signaling data associated with a circuit and comprising the single point code, wherein the first software node is assigned the single point code and the first software node appears to the PSTN as an endpoint to the PSTN;
- assign, by a software process module of the signaling gateway, a first internal point code to the first software node and a second internal point code to a second software node of the signaling gateway;
- determine, by the software process module, whether a first switch or a second switch is associated with the circuit; and
- route the signaling data to:
  - (i) the second software node using the second internal point code, the second software node connected to the first switch and appearing to the first switch as a first signal transfer point of the PSTN, if the first switch is associated with the circuit, or
  - (ii) to the second switch assigned the single point code, if the second switch is associated with the circuit.

14. The computer program product of claim 13, wherein the circuit is associated with a type of the signaling data.

15. The computer program product of claim 13, wherein the circuit is associated with a type of the signaling data and specific message data contained within the signaling data.

16. The computer program product of claim 13, wherein the circuit comprises a voice trunk associated with the point code.

17. The computer program product of claim 13, further comprising instructions being operable to cause the data processing apparatus to route the signaling data to a third software node, wherein the third software node is connected to the first switch and the third software node appears to the first switch as a second signal transfer point of the PSTN, if the first switch is associated with the circuit.

18. The computer program product of claim 17, further comprising instructions being operable to cause data processing apparatus to route the signaling data to the second software node or the third software node based on a load balancing technique.

19. A signaling gateway using a single point code to represent multiple switching devices, the signaling gateway being serially connected between a first switch and a PSTN, the signaling gateway comprising:
- a means for receiving, via a first software node of the signaling gateway, signaling data associated with a circuit and comprising the single point code, wherein the first software node is assigned the single point code and the first software node appears to the PSTN as an endpoint of the PSTN;
- a means for assigning, via a software process module of the signaling gateway, a first internal point code to the first software node and a second internal point code to a second software node of the signaling gateway;
- a means for determining, via the software process module, whether the first switch or a second switch is associated with the circuit; and
- a means for routing the signaling data to:
  - (i) the second software node using the second internal point code, the second software node connected to the first switch and appearing to the first switch as a first signal transfer point of the PSTN, if the first switch is associated with the circuit, or
  - (ii) the second switch, assigned the single point code, if the second switch is associated with the circuit.

20. The signaling gateway of claim 1, wherein the first switch is not directly connected to the PSTN by signaling links.

21. The signaling gateway of claim 1, wherein routing the signaling data comprises routing a signaling message without altering the protocol of said message.

22. The signaling gateway of claim 1, wherein routing the signaling data is based on a routing table maintained by the signaling gateway.

23. The method of claim 4, wherein the signaling data is routed to (iii) a third software node, wherein the third software node is connected to the first switch and appears to the first switch as a second signal transfer point of the PSTN, if the first switch is associated with the circuit.

24. The method of claim 23, further comprising routing the signaling data to the second software node or the third software node based on a load balancing technique.

* * * * *